United States Patent [19]

Morita et al.

[11] Patent Number: 5,147,143
[45] Date of Patent: Sep. 15, 1992

[54] PRINTER CARRIAGE HOMING MECHANISM

[75] Inventors: Toshiki Morita, Toyoake; Takeshi Niikawa, Nagoya; Kiroyuki Kato, Nagoya; Masashi Suzuki, Nagoya, all of Japan

[73] Assignee: Brother Kogyo Kabushiki Kaisha, Nagoya, Japan

[21] Appl. No.: 536,787

[22] Filed: Jun. 12, 1990

[30] Foreign Application Priority Data

Jun. 12, 1989 [JP] Japan .................................. 1-149082

[51] Int. Cl.⁵ .............................................. B41J 19/30
[52] U.S. Cl. .................................. 400/279; 400/322; 400/583.4; 400/903
[58] Field of Search ............... 400/320, 322, 328, 689, 400/902, 903, 583.4, 279; 318/685, 696

[56] References Cited

U.S. PATENT DOCUMENTS

| 3,893,012 | 7/1975 | Lin | 318/696 |
|---|---|---|---|
| 3,941,230 | 3/1976 | Bellino et al. | 400/903 |
| 4,066,941 | 1/1978 | Foster | 400/583.4 |
| 4,203,678 | 5/1980 | Nordstrom et al. | 400/903 |
| 4,538,933 | 9/1985 | Imaizumi et al. | 400/583.4 |
| 4,693,618 | 9/1987 | Hanagata | 400/903 |
| 4,869,610 | 9/1989 | Nishizawa et al. | 400/903 |
| 5,033,889 | 7/1991 | Carney | 400/903 |

FOREIGN PATENT DOCUMENTS

| 0242344 | 10/1987 | European Pat. Off. | |
|---|---|---|---|
| 7386 | 1/1983 | Japan | 400/903 |
| 185284 | 10/1983 | Japan | 400/903 |
| 191180 | 11/1983 | Japan | 400/322 |
| 187882 | 10/1984 | Japan | 400/322 |
| 120080 | 6/1985 | Japan | 400/903 |
| 141578 | 7/1985 | Japan | 400/903 |
| 5870 | 1/1987 | Japan | 400/903 |
| 56169 | 3/1987 | Japan | 400/322 |
| 1175896 | 1/1970 | United Kingdom. | |
| 2023893 | 1/1980 | United Kingdom. | |
| 2138226 | 10/1984 | United Kingdom. | |

OTHER PUBLICATIONS

IBM Tech Disc Bull; "Stepper Motor Drive for a Printer Escapement System"; vol. 28, No. 2, pp. 779-781; Jul. 1985.
IBM Tech Disc Bull; "Extending the Speed Range for a Permanent Magnet Stepper Motor"; vol. 28, No. 11, pp. 4914-4915; Apr. 1986.
IBM Tech Disc Bull; "Method for Reducing Acoustic Noise"; vol. 29, No. 3, pp. 1435-1438; Aug. 1986.

Primary Examiner—David A. Wiecking
Attorney, Agent, or Firm—Oliff & Berridge

[57] ABSTRACT

A printer which includes a position controller for moving a printing head to a predetermined initial position by driving a stepping motor during initial processing operation, and a current controller for supplying a second current to the stepping motor to spontaneously start the stepping motor. Since the stepping motor is driven by the second current which is smaller than a first current to be supplied during printing, the noise to be produced during the initial homing operation can be minimized.

18 Claims, 4 Drawing Sheets

PRINTER CARRIAGE HOMING MECHANISM

BACKGROUND OF THE INVENTION

1. Field of the Invention

This invention relates to a printer in which a printing head is moved to a predetermined initial position by driving a stepping motor at the time of initial processing.

2. Prior art

In many printers, a position for determining an initial printing position has been set at an end portion of a traveling area of a printing head. The printing head is moved to the initial printing position when power is supplied or a reset command is input before general printing operation is started.

In order to correctly move the printing head to the initial position, a stepping motor, which can correctly control the rotating angle, is used as a printing head driving motor. In the initial processing operation, however, the known speed-up and slow-down control cannot be executed because the traveling distance of the printing head is indeterminate. To cope with this, the stepping motor is driven by a known method referred to as self-starting. Namely, a rotor salient pole of the stepping motor stops temporarily at a stable point (which is provided between each excitation pole for one-phase exciting method and between two excitation poles for two-phase exciting method) while it is rotating in synchronism with control pulse signals. (This movement is hereinafter referred to as step driving.) Thus, the stepping motor is driven in the condition that starting, stopping and inversion of rotating direction can be instantaneously executed to move the printing head to the initial position.

In the above-mentioned printer, the stepping motor is driven by the relatively high-level constant current required to compensate for the torque necessary to move the printing head at a high speed for high-speed printing, etc. When the stepping motor is thus actuated by self-starting, noise is apt to be generated. Therefore, when the traveling distance of the printing head to the initial position is relatively long, an uncomfortable pulse sound may be generated.

SUMMARY OF THE INVENTION

The object of the present invention is to provide a printer in which the noise generated in the self-starting of the stepping motor during initial processing operation can be decreased.

To achieve this object, the printer of the present invention has a constitution as set forth below. Namely, as shown in FIG. 1, the printer of the present invention includes a stepping motor M2 for reciprocating a printing head M1 in a predetermined direction in relation to a printing medium, and a position control means M3 for moving the printing head M1 to a predetermined initial position within the range of the reciprocation of the printing head M1 by driving said stepping motor M2 during initial processing operation, wherein the position control means M3 includes a current control means M4 for spontaneously starting the stepping motor M2 by a second driving current which is smaller than a first driving current supplied to said stepping motor M2 during printing.

BRIEF DESCRIPTION OF DRAWINGS

For a more complete understanding of the present invention and the advantages thereof, reference is now made to the following description taken in conjunction with the accompanying drawings in which.

DETAILED DESCRIPTION OF PREFERRED EMBODIMENT

Figure 1:
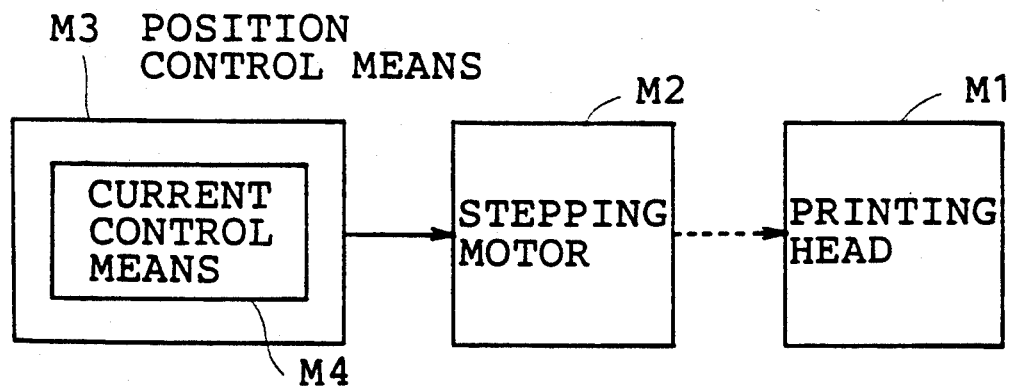
FIG. 1 is a schematic view showing a fundamental structure of the present invention.
Figure 2:
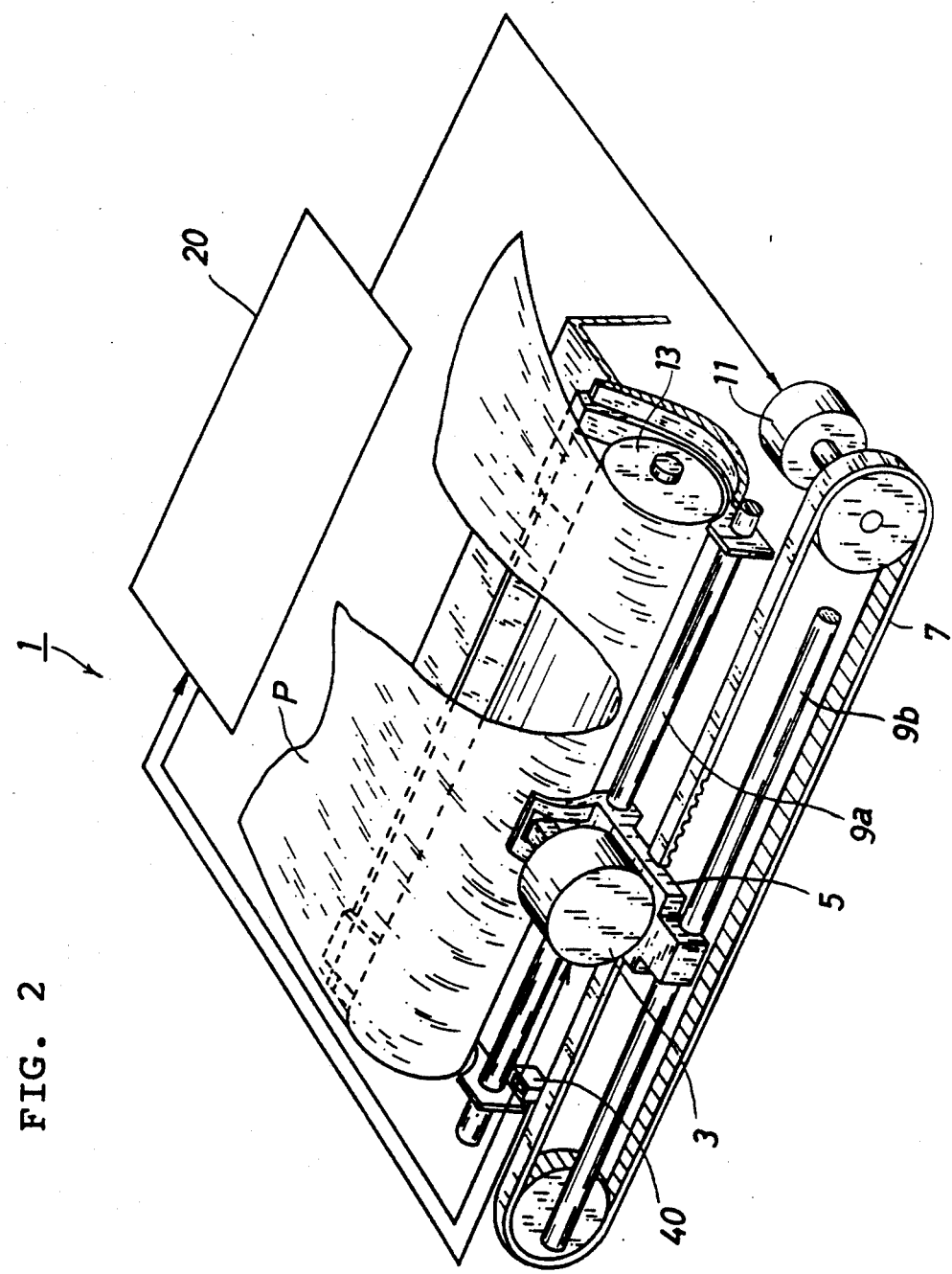
FIG. 2 is an explanatory view for showing a printer of an embodiment of the present invention.

One of the preferred embodiments of the present invention is set forth in reference with the attached drawings. As shown in FIG. 2, a printer 1 of the present embodiment is a dot-impact type serial printer for printing characters or figures on a printing paper P based on print data or print control data input from a host computer (not shown). The printer 1 primarily consists of a carriage 5 with a printing head 3, a carriage motor (hereinafter referred to as CR motor) 11 for moving the carriage 5 along guide bars 9a and 9b by means of a timing belt 7, a paper feed motor (not shown) for feeding the printing paper P set on a platen 13 by rotating the platen 13, and an electronic control circuit 20 which functions as a position control means M3 for controlling the printing head 3 and the above-mentioned various motors.

The CR motor 11 is a known stepping motor. The rotating speed and direction (normal direction and reverse direction) of this motor are controlled by the electronic control circuit 20. When power is supplied or the power switch is reset, or when the rotation is low level, the motor is driven in a self-driving condition in which starting, stopping, and inversion of the rotating direction can be spontaneously executed. Moreover, in the execution of printing, the motor is driven at a high speed by controlling the pulse rate based on the known speed-up and slow-down control so that the positioning of the printing head 3 is accurately carried out.

Figure 3:
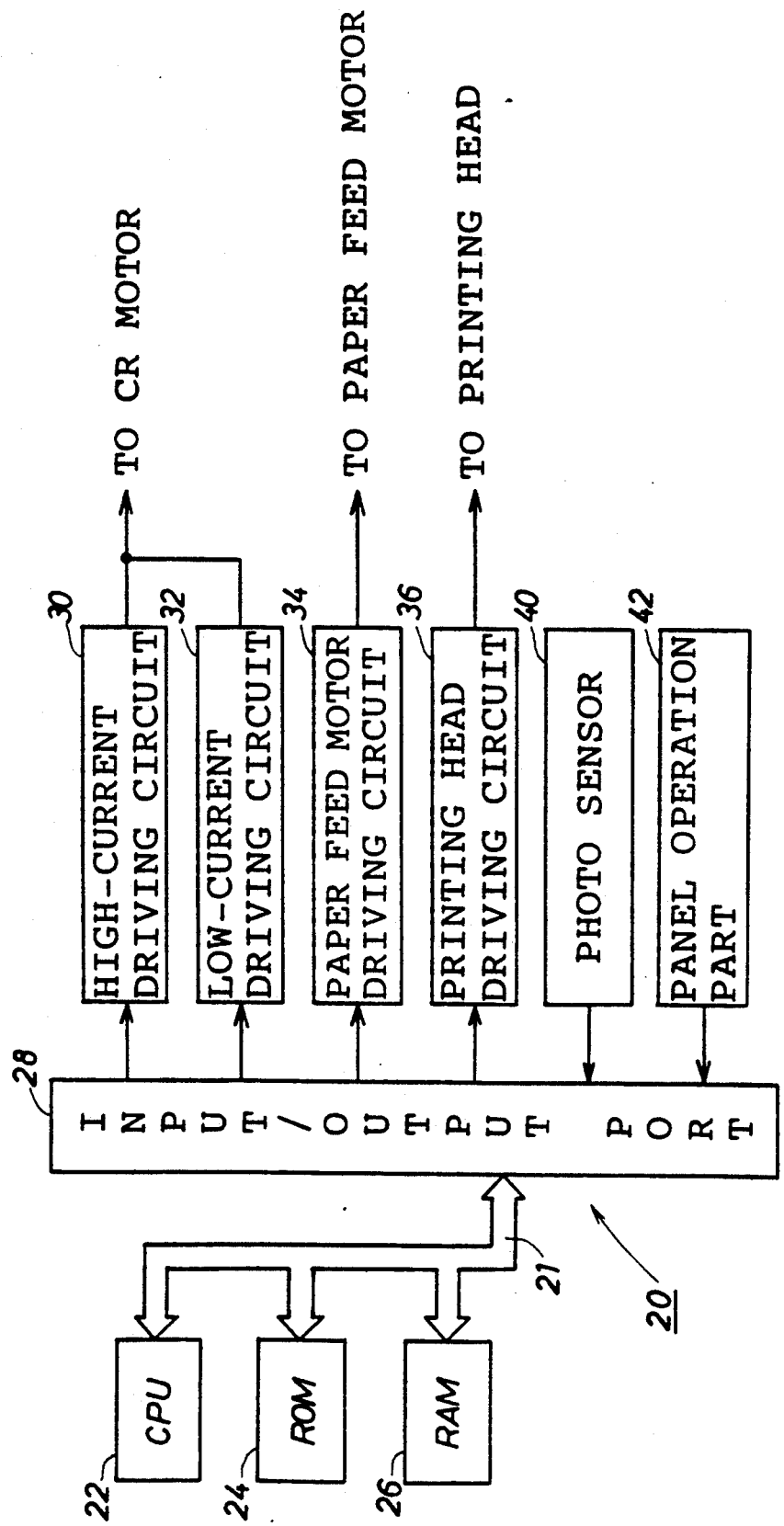
FIG. 3 is a block diagram showing an electronic control circuit of the present invention.

As shown in FIG. 3, the electronic control circuit 20 primarily consists of a known CPU 22, a ROM 24 and a RAM 26 which are interconnected via a bus 21, an input/output port 28, a high current driving circuit 30 for outputting a high-level constant current to the CR motor 11, a low current driving circuit for outputting low level constant current to the CR motor 11, a paper feed motor driving circuit 34, and a printing head driving circuit 36 for driving the printing head 3. The high current driving circuit 30, the low current driving circuit 32, the paper feed motor driving circuit 34 and the printing head driving circuit 36 are connected to the input/output port 28.

The ROM 24 stores various programs for printing characters or figures on the print paper P by driving the individual motors and the printing head 3 in accordance with print (control) data input from the host computer. Moreover, it stores dot patterns corresponding to the input print data and exciting timing data for the CR motor 11. The input/output port 28 is connected with a panel operation part 42 including a reflection type photo sensor 40, which is located as to face with the initial position to check if the printing head 3 is positioned at the initial position, as well as a panel switch (not shown) and a display (not shown).

The high current driving circuit 30 and the low current driving circuit 32 are known chopper type constant current circuits in which power is supplied to each phase of the CR motor 11 by a predetermined sequence (e.g., two-phase exciting method) in synchronism with the pulse signals input from the input/output port 28. Namely, the pulse signals in the individual rates for the speed-up and slow-down control and for self-starting operation are generated at the input/output port 28 based on the exciting timing data stored in the ROM 24. For general printing or high-speed printing, or in the case of short-distance traveling where the speed-up and slow-down control cannot be executed, the high current driving circuit 30 drives the CR motor 11 at a middle or a high speed in synchronism with the pulse signals for the speed-up and slow-down control or for the self-starting operation. For detection of the initial position (to be explained later), the low current driving circuit 32 drives the CR motor 11 at a low speed in synchronism with the pulse signals for the self-starting operation rate.

The pulse rate of the pulse signals for self-starting operation input into the high current driving circuit 30 and the low current driving circuit 32 are absolutely the same during the self-starting operation.

Moreover, current output from the high current driving circuit 30 is adjusted to a level at which compensation is made for the motor torque required for a high-speed operation. The current output from the low current driving circuit 32 is adjusted to, a minimum level at which the self-starting operation is possible.

The paper feed motor driving circuit 34 feeds the print paper P by driving the paper feed motor based on the input print control data (paper feed code). The printing head driving circuit 36 selectively drives a wire (not shown) of the printing head 3 based on the dot patterns stored in the ROM 24 corresponding to the input print data, and prints characters or figures on a dot matrix in a predetermined size.

Figure 4:
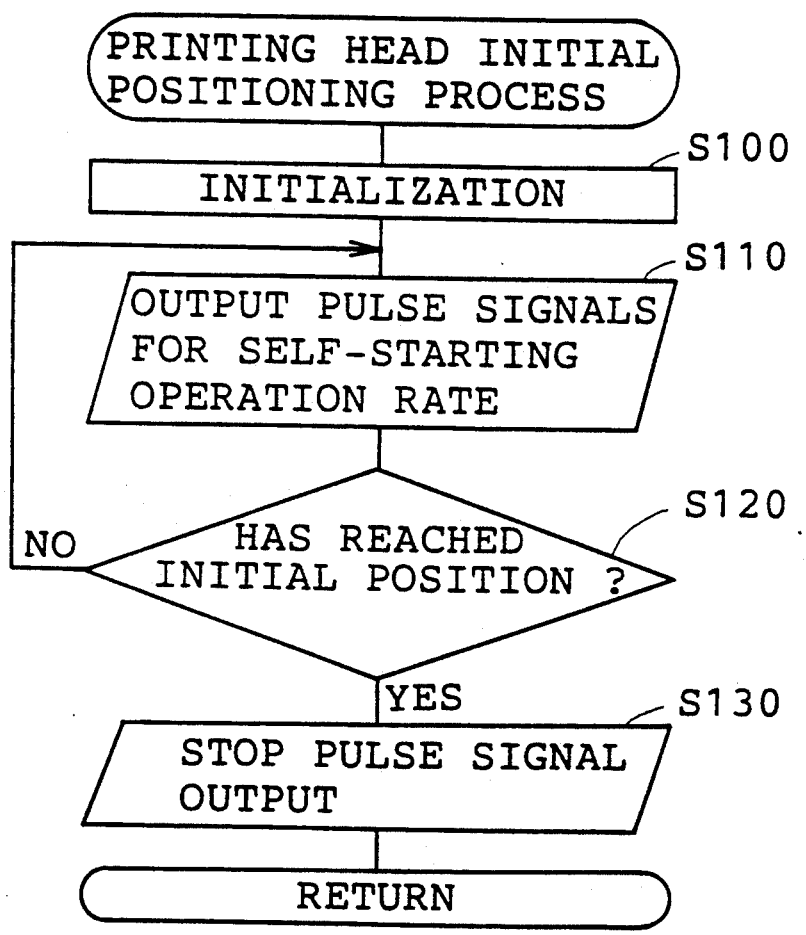
FIG. 4 is a flowchart for showing the process for moving the printing head to the initial position which is executed in the electronic control circuit.

The process for driving the printing head to the initial position, which is executed in the electronic control circuit 20 having the above-mentioned constitution, is set forth in reference with the flowchart of FIG. 4.

This process is executed when power is supplied to the printer 1, or a reset command is input from the host computer to the printer 1, or during initial process when an error condition such as when a cover of an opening is removed.

First, at S100, initialization, including erasing of various memory regions or setting of various initial values of RAM 26 and port allotment of the input/output port 28, are executed, and the process step proceeds to S110. At S110, the pulse rate for the self-starting operation is selected, and the pulse signal of the same rate is output from the input/output port 28 to the low current driving circuit 32. Thus, the CR motor 11 is driven by the self-starting operation in accordance with the minimum level current output from the low current driving circuit 32.

Subsequently, at S120, it is determined whether the printing head 3 has reached the initial position by checking if a detection signal is input from a photo sensor 40. When the detection signal has not been input yet, i.e., the printing head 3 has not reached the initial position, the process step returns to S110, and the output of the above-mentioned pulse signal is continued.

On the other hand, when the detection signal is input and it is determined at S120 that the printing head 3 has reached the initial position, the process step proceeds to S130, and the output of the pulse signal is stopped. (Namely, the movement of the CR motor 11 is stopped.) Thus, the present process is concluded.

After the above-mentioned process for moving the printing head to the initial position is accomplished, the electronic control circuit 20 carries out various processes for printing operation when the print data or the print control data are input from the host computer.

In the present embodiment, the above mentioned processes at S110 and S120 and the low current driving circuit 32 correspond to the current control means M4.

As set forth in the present embodiment, during the initial starting, the low current driving circuit 32 drives the CR motor 11 to move the printing head 3 to the initial position. Since the CR motor 11 is driven by a low current, the suction torque in the exciting phase is restrained. As a result, the noise generated during self-starting operation is lowered. Accordingly, generation of noisy and uncomfortable pulse sounds can be prevented during self-starting operation in the initial processing operation.

Obviously, numerous modifications and variations of the present invention are possible in the light of the above teachings. It is therefore to be understood that within the scope of the claims, the invention may be practiced otherwise than as specifically described herein.

For example, in the present embodiment, the high current driving circuit 30 and the low current driving circuit 32 have independent constitutions, respectively. It is, however, possible to unite the above-mentioned two circuits 30 and 32 as a single driving circuit in which the selection of the high-level current and the low-level current is possible. In this case, a more simple constitution of the electronic control circuit can be realized.

What is claimed is:

1. A printer comprising:
    a print head;
    a stepping motor for reciprocating the print head in a predetermined direction in relation to a print medium;
    a print-head control means for driving the stepping motor to move the print head within a range of reciprocation of the print head by selectively supplying either of a first driving current or a second driving current to the stepping motor, where the first driving current is greater than the second driving current; and
    a detecting means for detecting an ongoing initial positioning operation for the print head, the second driving current being supplied during the initial positioning operation.

2. The printer of claim 1, in which the print-head control means comprises:
    a high-current driving circuit for supplying the first driving current; and
    a low-current driving circuit for supplying the second driving current.

3. The printer of claim 1, in which the print head control means comprises a current driving circuit for selectively supplying the first driving current or the second driving current.

4. The printer of claim 2, in which the print head control means further comprises processing means for selecting the low-current driving circuit during initial processing operation to move the print head to a predetermined initial position and subsequently selecting the high-current driving circuit when the print head reaches the predetermined initial position.

5. The printer of claim 3, in which the print head control means further comprises processing means for directing the current driving circuit to supply the second driving current during initial processing operation to move the print head to a predetermined initial position and subsequently directing the current driving circuit to supply the first driving current when the print head reaches the predetermined initial position.

6. A printer comprising:
a print head;
a stepping motor for reciprocating the print head in a predetermined direction in relation to a print medium;
a print-head control means for driving the stepping motor to move the print head within a range of reciprocation of the print head; and
a detecting means for detecting an initial positioning operation for the print head, wherein
the print head control means drives the stepping motor to move the print head at high speed during printing by supplying a first driving current to the stepping motor; and
the print-head control means drives the stepping motor to move the print head at low speed to a predetermined initial position when the detecting means detects the initial positioning operation by supplying a second driving current to the stepping motor, where the second driving current is smaller than the first driving current.

7. The printer of claim 6, in which the print-head control means comprises:
a high current driving circuit for supplying the first driving current; and
a low-current driving circuit for supplying the second driving current.

8. The printer of claim 7, in which the printer further comprises processing means for selecting the low-current driving circuit during initial processing operation and subsequently selecting the high-current driving circuit when the print head reaches the predetermined initial position.

9. The printer of claim 8 in which:
the processing means further supplies pulse signals to selected one of the high-current driving circuit and low-current driving circuit;
the high-current driving circuit is a chopper type constant current circuit that supplies current to each phase of the stepping motor in synchronism with the pulse signals; and
the low-current driving circuit is a chopper type constant current circuit in which power is supplied to each phase of the stepping motor in synchronism with the pulse signals.

10. The printer of claim 9, in which the power is supplied to each phase of the stepping motor by means of a selected one of the high-current driving circuit and the low-current driving circuit in a predetermined sequence.

11. The printer of claim 10, in which the predetermined sequence is the two-phase exciting method.

12. The printer of claim 6, in which the print head control means comprises a current driving circuit for selectively supplying either the first driving current or the second driving current.

13. The printer of claim 12, in which the printer further comprises processing means for directing the current driving current to supply the second driving current during initial processing operation and subsequently directing the current driving circuit to supply the first driving current when the print head reaches the predetermined initial position.

14. The printer of claim 13, in which:
the processing means further generates pulse signals; and
the current driving circuit is a chopper type constant current circuit in which power is supplied to each phase of the stepping motor in synchronism with the pulse signals.

15. The printer of claim 14, in which the power is supplied to each phase of the stepping motor by the current driving circuit in a predetermined sequence.

16. The printer of claim 15, in which the predetermined sequence in the two-phase exciting method.

17. A printer comprising:
a print head for printing on a print medium;
a print head driving circuit for controlling the print head;
a stepping motor for reciprocating the print head in a predetermined direction in relation to the print medium; and
a print-head control means for driving the stepping motor to move the print head within a range of reciprocation of the print head including
a high-current driving circuit for supplying a first driving current to the stepping motor such that the printhead control means drives the stepping motor to move the print head at high speed during printing, and
a low-current driving circuit for supplying a second driving current to the stepping motor such that the print-head control means drives the stepping motor to move the print head at low speed to a predetermined initial position during an initial positioning operation, where the second driving current is smaller than the first driving current;
a paper-feed-motor driving circuit for controlling a paper feed motor to move the print medium during printing;
a detecting means for detecting the initial positioning operation for the print head and determining when the print head reaches the predetermined initial position; and
a processing means for controlling the print head driving circuit and paper-feed-motor driving circuit and selecting either the high-current driving circuit or the low-current driving circuit for driving the stepping motor.

18. The printer of claim 17, wherein:
the detecting means sends a signal to the processing means indicating that the print head has reached the initial position; and
upon receiving the signal from the detecting means, the processing means switches control of the stepping motor from the low-current driving circuit to the high-current driving circuit.

* * * * *

UNITED STATES PATENT AND TRADEMARK OFFICE
CERTIFICATE OF CORRECTION

PATENT NO.  : 5,147,143
DATED       : September 15, 1992
INVENTOR(S) : Toshiki MORITA et al.

It is certified that error appears in the above-identified patent and that said Letters Patent is hereby corrected as shown below:

On the title page:

Item (75): Among the inventors, change one inventor's name from "Kiroyuki Kato" to --Hiroyuki Kato--.

Signed and Sealed this

Seventh Day of September, 1993

Attest:

BRUCE LEHMAN

*Attesting Officer*                *Commissioner of Patents and Trademarks*